Jan. 3, 1933.    T. C. WHITEHEAD ET AL    1,893,478
REFRIGERATING APPARATUS
Filed June 22, 1931    2 Sheets-Sheet 1
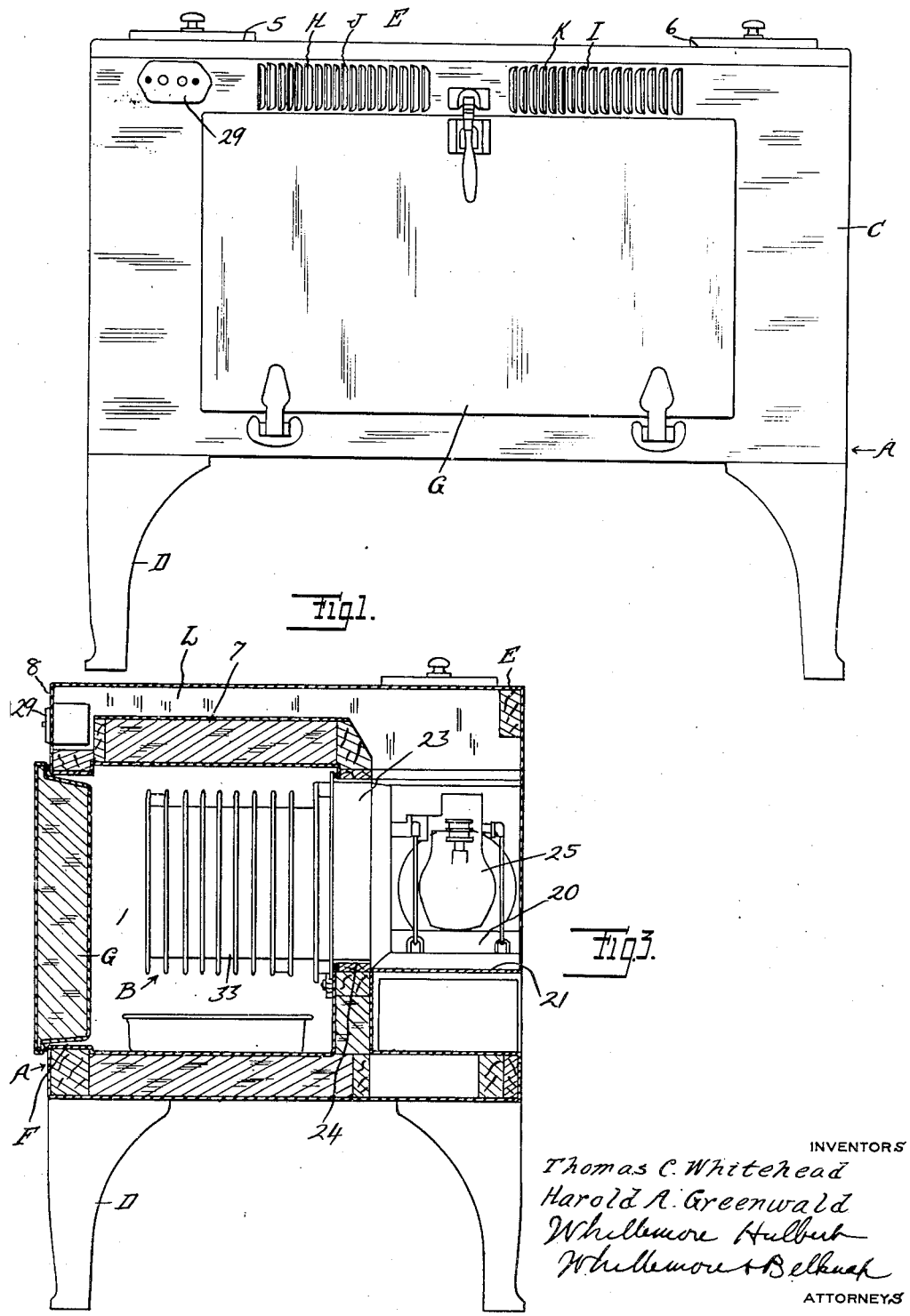
INVENTORS
Thomas C. Whitehead
Harold A. Greenwald
Whittemore Hulbert
Whittemore & Belknap
ATTORNEYS Jan. 3, 1933.  T. C. WHITEHEAD ET AL  1,893,478
REFRIGERATING APPARATUS
Filed June 22, 1931  2 Sheets-Sheet 2
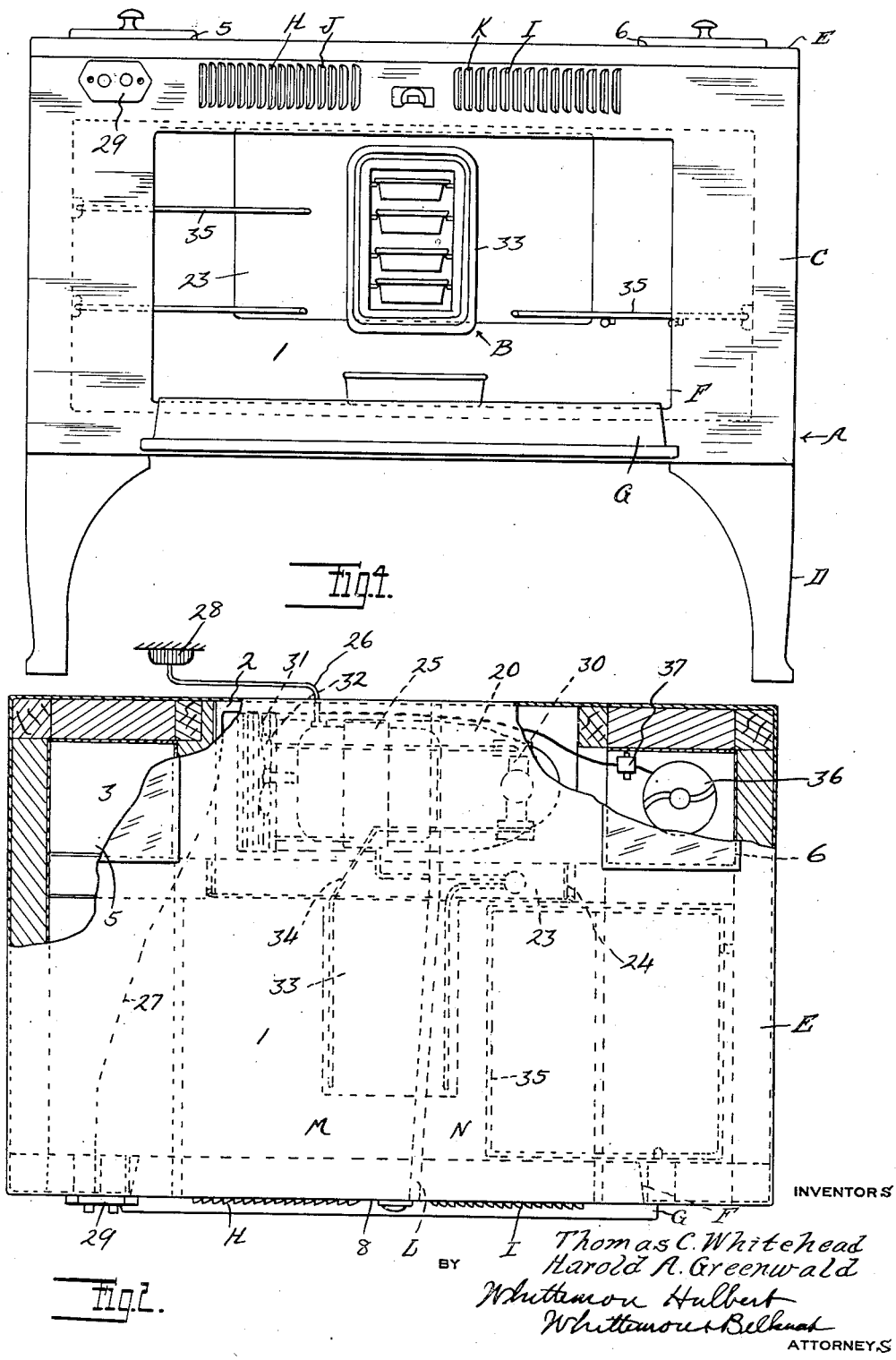
INVENTORS
Thomas C. Whitehead
Harold A. Greenwald
BY Whittemore Hulbert
Whittemore & Belknap
ATTORNEYS Patented Jan. 3, 1933

1,893,478

UNITED STATES PATENT OFFICE

THOMAS C. WHITEHEAD AND HAROLD A. GREENWALD, OF DETROIT, MICHIGAN, ASSIGNORS, BY DIRECT AND MESNE ASSIGNMENTS, TO KELVINATOR CORPORATION, OF DETROIT, MICHIGAN, A CORPORATION OF MICHIGAN

REFRIGERATING APPARATUS

Application filed June 22, 1931. Serial No. 546,090.

This invention relates generally to household refrigeration and refers more particularly to a table refrigerator.

One of the essential objects of the invention is to provide a refrigerator of this type wherein the table is provided beneath the top thereof with a compartment containing several chambers respectively for the reception of food, refrigerating apparatus, vegetables and kitchen utensils such as a quick mixer and fruit squeezer.

Another object is to provide a refrigerator wherein the chambers for food and refrigerating apparatus are accessible from one side of the table, while the chambers for the vegetables and kitchen utensils are accessible from the top of the table.

Another object is to provide a refrigerator wherein the chamber for food and the chamber for refrigerating apparatus are normally insulated from one another by a partition member carried by the refrigerating apparatus, the chamber for vegetables is insulated from the chamber for refrigerating apparatus but is in communication with the chamber for food whereby the cooling unit of the refrigerating apparatus may cool both chambers, and the chamber for utensils is insulated from the food chamber but is in communication with the chamber for refrigerating apparatus whereby the quick mixer and/or squeezer may be electrically connected to the electrical conductors leading to the motor of the apparatus.

Other objects, advantages and novel details of construction of this invention will be made more apparent as this description proceeds, especially when considered in connection with the accompanying drawings, wherein:

Figure 1 is a front elevation of a table refrigerator embodying our invention;

Figure 2 is a top plan view thereof;

Figure 3 is a vertical sectional view through the refrigerator;

Figure 4 is a front elevation with the door in open position.

Referring now to the drawings, A is the table and B is the refrigerating apparatus of a table refrigerator embodying our invention.

As shown, the table A has a compartment C supported by legs D and provided with a flat top E. The compartment C has an opening F in its front wall normally closed by a door G and contains four chambers 1, 2, 3 and 4 respectively. Preferably the chamber 1 extends across the compartment C from one side to the other immediately in rear of and is accessible through the opening F; the chamber 2 is immediately in rear of and opens into the chamber 1 at the center thereof; the chamber 3 is at one end of the chamber 2 in rear of the chamber 1 and is accessible through an opening 5 and the top E of the table, and the chamber 4 is at the other end of the chamber 2 in the rear of the chamber 1 and is accessible through an opening 6 in the top E of the table. Preferably the chamber 3 is insulated from the chamber 2 and opens into the chamber 1, while the chamber 4 is insulated from the chamber 1 and opens into the chamber 2. In the present instance the ceiling 7 of the chamber 1 is spaced below the top E of the table and the front wall 8 of the compartment C is provided above the opening F with two sets H and I respectively of openings having oppositely inclined louvers J and K respectively. Preferably a partition L extends rearwardly from the front wall 8 of the compartment at a point between the sets H and I of openings to the chamber 2 and divides the space between the ceiling 7 and the top E of the table into two passages M and N respectively.

The refrigerating apparatus B is preferably a portable unit and preferably comprises a base 20 resting on the bottom 21 of the chamber 2, an insulated partition member 23 at the forward edge of the base and closing the opening 24 between the chambers 2 and 1, an electric motor 25 on the base and having electrical conductors 26 and 27 respectively connected to a wall plug 28 and an electric switch 29, the latter being preferably in the front wall of the compartment C, a refrigerator compressor 30 on the base and operable by the motor, a refrigerant condenser 31 on the base and adapted to receive refrigerant from the compressor, a fan 32 operable by the motor and adapted to draw air from the atmosphere in through the set H of openings to the chamber 2 to cool the motor, compressor and condenser and to propel such air outwardly through the set I of openings, and a cooling unit 33 supported upon the front of the partition member 23 within the chamber 1 and connected by tubing 34 to the condenser 31 and compressor 30 on the base.

In use, food may be placed on shelves 35 within the chamber 1 and vegetables may be placed within the chamber 3 so that the food may be cooled and the proper moisture in the vegetables may be maintained by the cooling unit 33 in the chamber 1. In this connection it will be noted that the vegetables may be placed in or removed from the chamber 3 by moving them through the opening 5 in the top E of the table. It will also be noted that the door G opens outwardly and downwardly and assumes a substantially horizontal position when fully opened, consequently the door may be used temporarily as a shelf for articles before being placed in or after removal from the chamber 1. A quick mixer 36 or fruit squeezer (not shown) may be housed within the chamber 4 and may be connected to the conductors 26 and controlled by an electric switch 37. This mixer is accessible through the opening 6 in the top of the table and this top may be used like any other table top. Thus our construction as a compact unit serves as both a kitchen table and a refrigerator and not only obviates the purchase of a table and refrigerator as separate articles of furniture but also eliminates the necessity of moving from one to the other while they are in use.

What we claim as our invention is:

1. In a refrigerating apparatus, a relatively low flat topped refrigerator cabinet having an opening in its front vertical wall, a closure for said opening, a vertical insulating partition parallel to the front wall and dividing the cabinet into a food storage compartment located in front of said partition and a machine compartment located in back of said partition, refrigerating machinery supported by said partition with its heat absorbing portion in the food compartment and its heat dissipating portion in the machine compartment, said cabinet being provided with an opening in its top wall for permitting access to a third compartment located in the rear of the food storage compartment and communicating therewith, and being further located at one side of and insulated from the machine compartment.

2. In a refrigerating apparatus, a relatively low flat topped refrigerator cabinet having an opening in its front vertical wall, a closure for said opening, a vertical insulating partition parallel to the front wall and dividing the cabinet into a food storage compartment located in front of said partition and a machine compartment located in back of said partition, refrigerating machinery supported by said partition with its heat absorbing portion in the food compartment and its heat dissipating portion in the machine compartment, said cabinet being provided with an opening in its top wall for permitting access to a third compartment located in the rear of the food storage compartment and communicating therewith, and being further located at one side of and insulated from the machine compartment, a fourth compartment insulated from all the aforementioned compartments and accessible from the top wall of the cabinet, and an electrically operated food mixing apparatus located within the fourth compartment and connected in the control circuit of the refrigerating machinery.

In testimony whereof we affix our signatures.

THOMAS C. WHITEHEAD.
HAROLD A. GREENWALD.